N. BARRY.
METAL SPLIT PULLEY.
APPLICATION FILED FEB. 18, 1914.
1,223,024.
Patented Apr. 17, 1917.
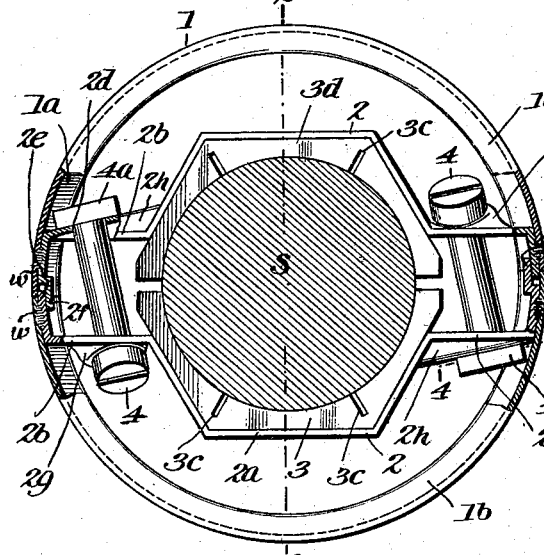
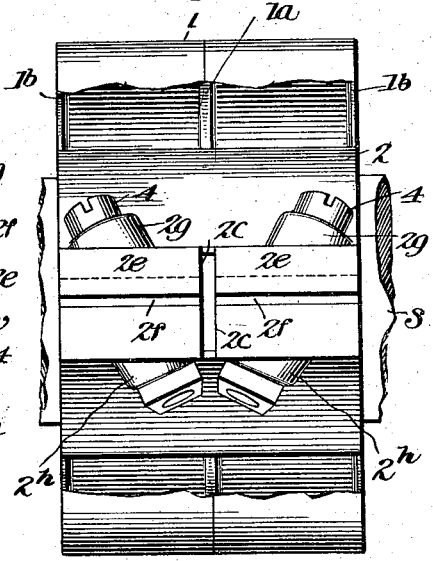
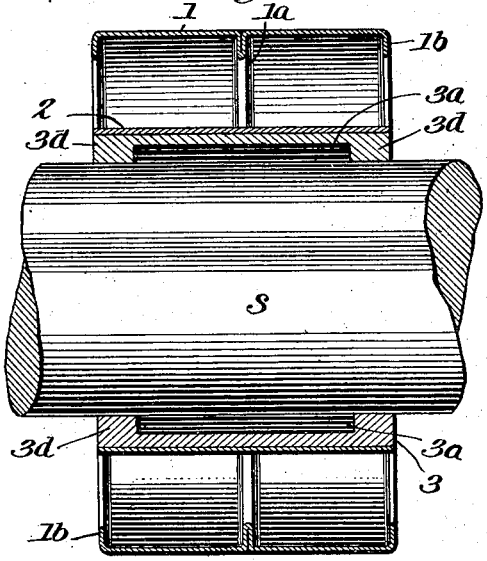
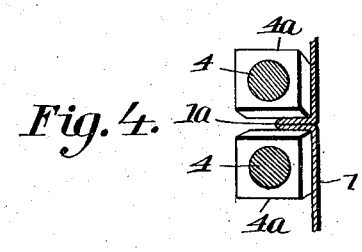
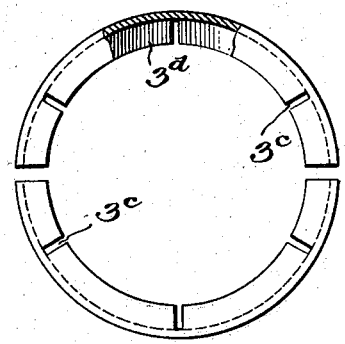
Witnesses
Philip E. Barnes
W. Wallace Nairn Jr.
Inventor
Nicholas Barry
By Dowell & Dowell
Attorneys

UNITED STATES PATENT OFFICE.

NICHOLAS BARRY, OF MUSCATINE, IOWA, ASSIGNOR TO BARRY MANUFACTURING COMPANY, OF MUSCATINE, IOWA, A CORPORATION OF IOWA.

METAL SPLIT PULLEY.

1,223,024.   Specification of Letters Patent.   Patented Apr. 17, 1917.

Application filed February 18, 1914. Serial No. 819,554.

*To all whom it may concern:*

Be it known that I, NICHOLAS BARRY, a citizen of the United States, residing at Muscatine, in the county of Muscatine and State of Iowa, have invented certain new and useful Improvements in Metal Split Pulleys; and I hereby declare that the following is a full, clear, and exact description thereof; reference being had to the accompanying drawings, which form part of this specification.

This invention relates to metal split pulleys, and its object is to produce an all metal split pulley which can be economically made of sheet metal, and which will be light and strong, and can be readily attached to and detached from shafts.

One pulley embodying the invention is illustrated in the accompanying drawings, and the invention will be explained in detail with reference to such drawings, to enable others to manufacture and use such pulleys. The essential features of the invention and novel combinations of parts for which protection is desired are summarized in the claims.

In said drawings:

Figure 1 is a side view of the complete pulley attached to a shaft.

Fig. 2 is an enlarged sectional view on line 2—2, Fig. 1.

Fig. 3 is an edge view thereof partly broken.

Fig. 4 is a detail section, looking downward, on line 4—4, Fig. 1.

Fig. 5 is a view of a circular bushing detached.

The present invention relates more particularly to small pulleys, and has especial reference to the means for clamping the pulley sections upon the shaft; but the novel clamping members are adaptable for use with large pulleys.

As shown in Fig. 1 the pulley is composed of two opposite similar sections each consisting of a semi-circular rim member 1 and a transverse clamping member 2 which connects the ends of the rim member and also forms part of the means for clamping or securing the pulley upon a shaft.

The rim member 1 of each pulley section is preferably stamped out of sheet metal, and bent in semi-circular form. Each rim member is preferably provided with one or more internal circumferential ribs 1ª, formed by bending the metal longitudinally upon itself, as shown, and the walls of such bends are preferably pressed close together, so that the outer surface of the rim section is substantially smooth; and such rib 1ª materially stiffens the rim section. The side edges of the rim section are preferably provided with inwardly projecting flanges 1ᵇ. This construction makes a strong rim with a full complete contact surface. After the rim members are formed they are preferably dipped in molten tin, or galvanized, to fill the crevices and make the surfaces of the members smooth, and to firmly unite or solder the sides of the bends 1ª together.

The opposite ends of each rim member are connected by a transversely disposed clamp and spoke member 2, which is preferably also formed of sheet metal, stamped into the form shown in Figs. 1 and 2. Each clamp member has its central portion 2ª bent to partially surround the shaft, and in the example shown in Fig. 1 this portion 2ª is polygonal; and at each side of this central portion 2ª and extending outwardly therefrom is a web or spoke portion 2ᵇ, the outer ends of such spoke portions are bent to fit closely against the inner surfaces of the ends of the rim member 1, and are secured thereto by suitable means, preferably by welding the members together at such points as indicated at *w*.

One end 2ᵉ of each clamp member is made to project or extend beyond the adjacent end of the rim member, as indicated in Fig. 1; and the other end of the clamp member is provided with a bayonet-shaped projection 2ᶠ; so when the pulley sections are placed together the projecting end 2ᵉ of one clamp member engages the bayonet-shaped end 2ᶠ of the other clamp member and forms a strong interlocked close joint between the ends of opposed pulley sections; while the ends of the rim members 1 of such sections abut closely together at such joints, see Fig. 1, and the exterior surface of the pulley is smooth and practically unbroken.

The projecting portions 2ᵉ, 2ᶠ of the ends of the clamp members are slotted as at 2ᶜ to accommodate the ends of the bent ribs 1ª of the rim members when the pulley sections are fastened together to make the complete pulley; and the interlocking ribs and slots help to prevent relative lateral displacement of the pulley sections longitudinally of the shaft.

The spoke portions 2ᵇ of the clamp members are perforated for the passage of the securing bolts 4. Preferably instead of having these bolts arranged parallel to the plane of the pulley the bolts are set at opposite angles thereto and for this purpose one spoke portion of the clamp member is provided with inclined bosses 2ᵍ near the outer edge thereof while the other spoke portion of said clamp member is provided with oppositely inclined bosses 2ʰ, near the center thereof. When the rim sections are put together the bosses 2ᵍ of one section should be opposite the bosses 2ʰ of the other section so that the fastening bolts 4 can be inserted through said bosses at a tangent to the shaft and to each other, as indicated in Figs. 1 and 2, and when so arranged it will be seen that the bolts can be readily engaged by a wrench or screw-driver from the side of the pulley without having to perforate the rims.

Heretofore, so far as I am advised, small split pulleys have been made with the clamp screws or bolts running straight through the bushing or the arms, and perpendicular to the shaft. This necessitated cutting holes through the rim of the pulley, in order to get at such screws or bolts with a screw-driver or wrench. Such openings are dangerous as persons might put their hands on the pulley and their fingers be caught in such holes. Not only are such holes dangerous when in the face of the pulley, but they lessen the belt contact, as such holes are from ¾ to 1 inch in diameter and on a pulley three inches wide, at the points where such holes are cut in the rim practically ⅓ or more of the contact surface is lost. In my pulley the clamp screws being set at an angle the rim of the pulley is continuous and without holes.

The bolts may be secured by nuts 4ᵃ which are preferably placed on the inner ends of the bolts adjacent the bosses 2ʰ, and in this position the nuts, if square, abut against the rib 1ᵃ and are locked, see Fig. 4.

The central portions 2ᵃ of the clamp members are adapted to fit over a removable split bushing 3, the parts of which are exteriorly shaped to fit in the portions 2ᵃ, and are internally bored to fit the shaft S on which the pulley is mounted. The split bushings 3 are removable, and interchangeable, so that the same pulley can be fitted to different sizes of shafting by providing it with a suitably sized bushing. While the central portions 2ᵃ of the clamp member are preferably bent into polygonal shape, as shown in Fig. 1, and the bushings similarly shaped exteriorly, such parts might be of other shape, for example, semi-circular, in which circular bushings would be employed, as indicated in Fig. 5.

By means of these bushings the pulley sections can be readily fastened on a shaft. The polygonal shape of the central portions of the clamp members and bushings as shown in Fig. 1 prevents the pulley slipping circumferentially on the bushing. The bolts are applied at each side of the bushing and securely clamp the pulley in position upon the shaft.

I preferably dip the completed pulley halves into molten tin, or galvanize same, to protect them against rust and to firmly unite the sides of the bends and fill up any crevices left at the bends or joints where the parts might not have been welded. Customarily electric welding is effected only in spots as indicated at $w$ and any slight crevices left between the unwelded portions will be filled by the tin or zinc, and thus insure close joints and prevent looseness.

The split bushings moreover, instead of being made the same thickness throughout, are preferably channeled at the centers as indicated at 3ᵃ and provided with interior flanges 3ᵈ on their ends which are adapted to engage the shaft, and these flanges may be axially slotted as shown at 3ᶜ so as to enable the bushings to be axially contracted upon the shaft when the clamps are tightened.

Bushings for metal pulleys are usually bored out slightly larger than the shaft on which they are to be clamped, and owing to slight variations in the size of the shafting, an allowance of about .005 of an inch over or under is made. My bushings can be bored out the exact size of the shaft; and if the shafting is slightly over size the slots 3ᶜ enable the bushing to be expanded to fit the shaft; if the shaft is over size the bushing can expand slightly; if the shaft is under size the bushing can contract slightly; this is a great practical convenience, as much trouble in the use of split pulleys is due to the bushings slipping on the shaft.

What I claim is:

1. The herein described split-pulley having two similar sections; each comprising a rim member having a circumferential bend and a spoke member having its ends fastened to the ends of the rim member and having a central portion bent to fit over a bushing and provided with inclined protuberances at opposite sides of said central portion, the ends of the spoke member projecting beyond the ends of the rim member and adapted to interlock with the ends of a similar spoke member on the opposed pulley section; together with bolts engaging said protuberances and arranged at an angle to each other and to the face of the pulley; and bushings adapted to be interposed between the bent portions of the spoke members and a shaft.

2. A split-pulley section comprising a rim member, a spoke-and-clamp member having its ends united to the ends of the rim member, one end of said spoke member projecting beyond that end of the rim member to which it is attached and the other end of the spoke member extending beyond that end of the rim member to which it is attached and its projecting end being bent into bayonet-shape; the bayonet end of such spoke member being adapted when assembled with a like pulley section to engage the projecting end of an opposed spoke member, while the ends of the opposed rim members abut, substantially as described.

3. In combination, opposite split-pulley sections having inclined bosses on their opposed faces, and straight fastening bolts engaging said inclined bosses said bolts lying at angles to the sides of the pulley sections so as to be accessible from the sides thereof, substantially as described.

4. In combination, opposite split-pulley sections having inclined bosses on their opposed faces, and straight fastening bolts engaging said inclined bosses and uniting said sections, said bolts lying at angles to each other and to the sides of the pulley sections so as to be accessible from the sides thereof, substantially as described.

5. In a split-pulley the combination of opposite pulley sections; each comprising a rim member; a clamp-and-spoke member connecting the ends of the rim member and having a central portion adapted to engage a suitable bushing and also having inclined perforated bosses at opposite sides of the central portion; and inclined clamping bolts engaging said bosses, substantially as described.

6. In a split-pulley the combination of opposite pulley sections; each comprising a rim member; a clamp-and-spoke member connecting the ends of the rim member and having a central portion adapted to engage a bushing and inclined bosses at opposite sides of the central portion; bushings in the central portion, and straight fastening bolts engaging said bosses and arranged at angles to the face of the pulley to permit access thereto from the sides of the pulley.

7. The herein described split-pulley composed of two similar sections; each comprising a rim member having a circumferential bend and a spoke member having its ends fastened to the ends of the rim member and having a central portion bent to fit over a suitable bushing and provided with inclined perforated bosses; together with angularly disposed fastening bolts engaging said bosses and arranged at an angle to each other and to the faces of the pulley sections, substantially as described.

8. In a split-pulley, opposite pulley sections each comprising a rim member, a spoke-and-clamp member having its ends united to the ends of the rim member, one end of said spoke member projecting beyond that end of the rim member to which it is attached and the other end of the spoke member extending beyond that end of the rim member to which it is attached and its projecting end being bent into bayonet-shape; the bayonet end of such spoke member being adapted to engage the projecting end of the opposed spoke member, while the ends of the rim members abut; together with straight securing bolts arranged at angles to each other and to the sides of the pulley and passed directly through said spoke members, substantially as described.

9. In a metal split-pulley, opposite sections each comprising a rim member having a circumferential bend and side flanges; and a clamp member having its ends bent and attached to the ends of the said rim member and its central portion bent to receive a suitable bushing, and provided with openings for the passage of bolts at opposite sides of the central portion; with pairs of straight bolts arranged at angles to each other and to the sides of the pulley and engaging the openings in the clamp members to clamp the sections together.

10. In a split-pulley, two similar sections; each comprising a rim member and a spoke member fastened to the ends of the rim member and having a central portion bent to fit over a bushing and its ends projecting beyond the ends of the rim member and adapted to interlock the opposed ends of a similar spoke member; together with pairs of straight bolts engaging said spoke members and arranged at angles to each other and to the face of the pulley, and bushings interposed between the bent portions of the spoke members and the shaft.

In testimony that I claim the foregoing as my own, I affix my signature in presence of two witnesses.

NICHOLAS BARRY.

Witnesses:
 AGNES FULLER,
 E. W. SMITH.